United States Patent

[11] 3,598,480

| [72] | Inventors | Isamu Kubota<br>Izumisano-shi;<br>Yoshihisa Hayashi, Sakai-shi; Takeshi<br>Ataka, Sumiyoshi-ku, all of, Japan |
|---|---|---|
| [21] | Appl. No. | 858,301 |
| [22] | Filed | Sept. 16, 1969 |
| [45] | Patented | Aug. 10, 1971 |
| [73] | Assignee | Minolta Camera Kabushiki Kaisha<br>Osaka, Japan |
| [32] | Priority | Sept. 27, 1968 |
| [33] | | Japan |
| [31] | | 69453 |

[54] AN ELECTROMAGNETIC RELEASE DEVICE FOR A MOTION-PICTURE CAMERA
5 Claims, 3 Drawing Figs.

| [52] | U.S. Cl. | 352/169, 352/178 |
|---|---|---|
| [51] | Int. Cl. | G03b 17/46 |
| [50] | Field of Search | 325/169, 174—179 |

[56] References Cited
UNITED STATES PATENTS

| 3,094,033 | 6/1963 | Thiele et al. | 352/169 |
|---|---|---|---|
| 3,238,008 | 3/1966 | Krumbein et al | 352/169 |
| 3,246,817 | 4/1966 | Floden | 352/169 X |
| 3,512,881 | 5/1970 | Kubota | 352/178 X |

Primary Examiner—S. Clement Swisher
Attorney—Watson, Cole, Grindle & Watson

ABSTRACT: A battery-energized electromagnetic release for selecting continuous or single frame advancement of the film comprises two electromagnetic coils and a charged condenser for actuating and holding an armature switch to release a rotary stop mechanism and activate the film drive motor. The condenser is switched from a connection with the battery to discharge through one coil and actuate the armature. An exposure changeover switch connects the two coils to the battery to retain the armature and continuously activate the motor.

AN ELECTROMAGNETIC RELEASE DEVICE FOR A MOTION-PICTURE CAMERA

BACKGROUND OF THE INVENTION

In motion-picture cameras it is known to release a shutter stopper mechanism by the action of an electromagnet to control a motor circuit for driving the shutter. Such a motor remote control for the camera release has, however, the disadvantage of an excessive consumption of electric power and is unsuitable for a small-sized camera using a small-type battery as an electric power source.

In regard to this fact, it is also well known to provide a condenser circuit with the electromagnet. In such a system, however, the operable condition is effected by switching between continuous filming and single frame exposure and yet in the single frame exposure setting the release operation is cycled repetitively, so that the current for charging the condenser flows through the electromagnet always during the single frame shot and thereby the consumption of the electric power source is increased.

SUMMARY OF THE INVENTION

In order to obviate the drawback mentioned above, in the present invention two electromagnetic coils are connected in series with a power source, a change over switch (to select either the serial filming or the single frame shot), and a release switch. One of the electromagnetic coils is connected in series with a condenser through a charge and discharge change over switch, and the condenser is connected to the power source through the charge and discharge change over switch. The release switch and the charge and discharge change over switch are interlocked so as to close the release switch and at the same time switch the charge and discharge change over switch to the contact on the discharge side.

The first object of the present invention is to provide that in the single frame exposure setting, the electromagnetic release device is operated only by discharge current of the condenser flowing through one of the electromagnetic coils.

The second object of the present invention is to provide that in the continuous filming setting the discharge current of the condenser flowing through one electromagnetic coil and current from the power source flowing through both electromagnetic coils operate the electromagnetic release device, and the operated condition thereof is held only by the current from the power source flowing through both electromagnetic coils.

The third object of the present invention is to provide that either in the continuous filming or single frame exposure setting, the waste of the electric power caused by continuous closing of the release switch is eliminated.

Still another object of the present invention is to provide an electromagnetic release device for elongating the durability of a battery in a small-sized motion picture camera small battery as a power source.

DESCRIPTION OF THE PREFERRED EMBODIMENT

Figure 1:
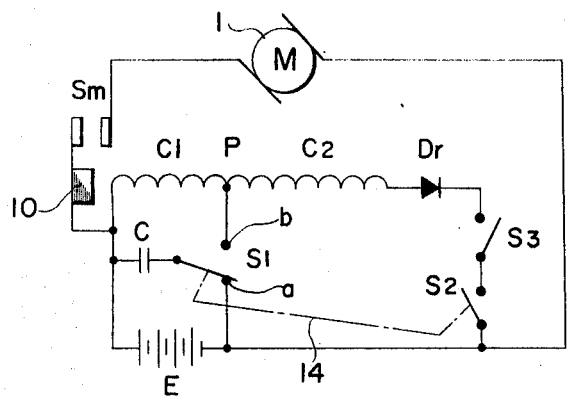
FIG. 1 is a wiring diagram showing an electric circuit of an embodiment in accordance with the present invention.

Referring to FIG. 1, charge and discharge change over switch S1 (normally closed) is interlocked by means of interlocking member 14 with release switch S2 (normally open). When release switch S2 is closed by the release operation, charge and discharge change over switch S1 is moved to contact $b$ on the discharge side.

The charge circuit for condenser C is formed through charge and discharge change over switch S1 and contact $a$ on the charge side thereof. Condenser C is connected to electromagnetic coil C1 of the first electromagnet 11 (FIG. 2) in parallel with power source E and through said charge and discharge change over switch S1 and contact $b$ on the discharge side thereof, so as to form a discharge circuit.

To one end of electromagnetic coil C1, electromagnetic coil C2 of the second electromagnet 12 (FIG. 2) is connected in series with power source E through rectifier $D_r$, release switch S2 and changeover switch S3. First and second electromagnets 11, 12 are wound respectively with electromagnetic coils C1, C2 so as to form the same polarity magnetic fields.

In the motor circuit connected to power source E, there are provided motor 1 and motor switch Sm for making and breaking the circuit by means of stop lever 6 having armature 10 to be attracted by both electromagnets 11, 12.

Figure 2:
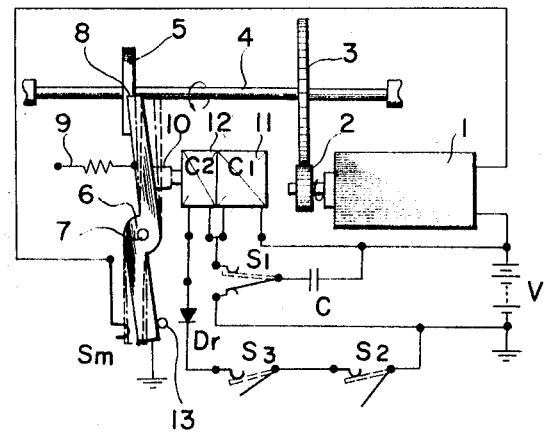
FIG. 2 is a side view showing the disposition of the essential parts of the mechanical features in accordance with the present invention.
Figure 3:
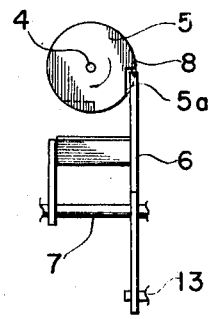
FIG. 3 is a front elevation of a stopper mechanism used in the embodiment shown in FIG. 2.

Referring to FIG. 2 and FIG. 3, on main spindle 4 of main spindle gear 3 in mesh with motor gear 2 of motor 1, there is provided rotary stopper 5 having notch 5a. Stop lever 6 is connected rotatably to pin 7, and retaining portion 8 of the end of lever 6 is adapted to slide along the face of rotary stopper 5 and engaging with notch 5a thereof by spring 9. Onto the back side of spring 9 there is fixed armature 10 facing electromagnets 11, 12 with a space usually therebetween. And, on the other end of stop lever 6 is motor switch Sm so mounted that when notch 5a engages with retaining portion 8 switch Sm is opened and when armature 10 is attracted to the electromagnet stop lever 6 turns to release lever 6 from engagement with the notch so that retaining portion 8 slides along the face of stopper 5, whereby switch Sm is closed. Reference numeral 13 designates a pin for limiting the rotation of stop lever 6.

In the present invention formed as described above, in order to provide continuous filming, exposure changeover switch S3 and release switch S2 are closed, thereby switching switch S1 from contact $a$ on the charge side to contact $b$ on the discharge side, and current from condenser C flows suddenly through the first electromagnetic coil C1. Simultaneously therewith, current from power source E flows through the first electromagnetic coil C1 and the second electromagnetic C2 to energize these two coils. However, the energization of the first coil C1 is large as compared with the energization of coil C2 so that armature 10 is attracted mainly by the magnetic force of electromagnet 11 and stopper 6 turns clockwise against spring 9 up to the position shown by the broken lines in FIG. 2. Thus retaining portion 8 breaks its engagement with notch 5a of rotary stopper 5. Simultaneously therewith, motor switch Sm is closed and motor 1 starts to rotate.

The discharge of condenser C terminates and thereafter only a small current, inversely proportional to the impedance of both electromagnetic coils C1, C2, flows from power source E. Therefore, the magnetic force of both electromagnets 11, 12 drops remarkably as compared with the time when condenser C is discharged, although armature 10 is held thoroughly in the position attracted by the magnetic force as mentioned above. Assuming the number of turns of both electromagnetic coils are respectively $n_1$, $n_2$, the ampere-turn thereof is:

$$i(n_1+n_2)$$

and, the attractive force of both electromagnets are added to each other, therefore, a large retaining force can be obtained by relatively small current $i$ and accordingly it is possible to utilize the power source efficiently.

In order to stop the continuous filming, it is required only to open release switch S2. In this manner, the power current to electromagnetic coils C1, C2 is discontinued, the attraction of both electromagnets 11, 12 is removed, stopper lever 6 is pulled by spring 9, and retaining portion 8 comes into contact with rotary stopper 5. Motor switch Sm is still closed so that motor 1 continues to rotate and retaining portion 8 is sliding along the face of rotary stopper 5. Accordingly, before retaining portion 8 of stopper lever 6 engages with notch 5a of rotary stopper 5 to stop the rotation of rotary stopper 5, motor switch Sm is by no means opened.

Therefore, by providing so that the rotary shutter of a camera may screen the photographic objective in the position where said retaining portion 8 engages with said notch 5a, main spindle 4 continues to rotate at constant speed by means of motor 1 until the shutter is closed fully, and can stop in the position where the shutter screens fully.

By opening release switch S2 changeover switch S1 is changed over from contact b on the discharge side to contact a on the charge side, and condenser C is charged to enter the standby situation for the next release operation.

Next, when providing a single frame exposure, exposure changeover switch S3 is left opened. In this situation, when release switch S2 is closed, changeover switch S1 is changed over to contact b on the discharge side, the current charged in condenser C discharges through electromagnetic coil C1 instantaneously, armature 10 is attracted, the engagement of retaining portion 8 and notch 5a is disengaged, and motor switch Sm is closed to rotate motor 1. When once such a condition is effected, even though the discharge current of condenser C disappears retaining portion 8 is sliding along the face of rotary stopper 5 and motor switch Sm is held closed so that motor 1 continues to rotate. When rotary stopper 5 rotates once and retaining portion 8 comes to the next engaging situation with notch 5a, motor switch Sm is opened, motor 1 is stopped, and main spindle 4 is stopped in the position where the retaining portion 8 engages with said notch 5a.

As described above, in the present invention the release operation for attracting armature 10 is effected mainly by discharge current of condenser C running through the first electromagnetic coil, and in the continuous filming setting the armature is held by very small current from the power source flowing through both electromagnetic coils. In the single frame shot setting, after once the release switch is closed, the power current does not flow through the electromagnetic coils and, accordingly, it is possible to maintain the life of a battery as the power source for a long time.

We claim:

1. A battery-operated electromagnetic release device for selecting continuous or single frame film exposure, comprising;

a motor for driving the film, a switch for activating said motor, first and second electromagnetic coils serially interconnected with one another for holding said switch in a closed position, a condenser electrically connected to one end of said first coil, a two-position switch for connecting said condenser to said battery in one position and for connecting said condenser across said first coil in a second position, a selector switch interlocked with said two-position switch for selecting either continuous or single frame film exposure and connected to said battery, a release switch serially connecting one end of said second coil with said selector switch, whereby the positioning of said two-position switch in said second position closes said motor switch and said motor switch is retained closed only when said release switch is in its closed position and said selector switch is set for continuous film exposure.

2. A battery-operated electromagnetic release device as in claim 1, wherein said first and second coils have the same polarity to generate a magnetic force sufficient to retain said motor switch in a closed position when said release switch is closed and said selector switch is set for continuous film exposure.

3. A battery-operated electromagnetic release device as in claim 1 wherein said motor switch includes a rotatable armature operatively associated with said first and second coils and further comprising a rotary cam driven by said motor, said cam having a notch for engagement with one end of said armature, said armature is normally biased to engage said notch, whereby said armature is withdrawn from engagement with said notch by positioning said two-position switch in said second position, and said motor switch is opened by engagement of said armature end with said notch.

4. A battery-operated electromagnetic release device as in claim 3 wherein said armature end is retained in a nonengaging position with said notch by the magnetic force generated by said first and second coils connected to said battery by closure of said release switch and said selector switch is set for continuous film exposure, said armature end is positioned to ride on the surface of said cam to retain said motor switch in a closed position.

5. A battery-operated electromagnetic release device as in claim 3 wherein said motor switch is opened by reengagement of said armature end with said notch upon rotation of said cam when said release switch is open and said selector switch is set for single frame film exposure.